US012796667B2

(12) United States Patent
Kawamura et al.

(10) Patent No.: US 12,796,667 B2
(45) Date of Patent: Nov. 17, 2026

(54) REEL SEAT GRIP MEMBER, REEL SEAT GRIP STRUCTURE, AND FISHING ROD

(71) Applicant: GLOBERIDE, Inc., Higashikurume (JP)

(72) Inventors: Takuji Kawamura, Higashikurume (JP); Keisuke Nakagawa, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/685,154

(22) PCT Filed: Oct. 14, 2022

(86) PCT No.: PCT/JP2022/038346
§ 371 (c)(1),
(2) Date: Feb. 20, 2024

(87) PCT Pub. No.: WO2023/095483
PCT Pub. Date: Jun. 1, 2023

(65) Prior Publication Data

US 2024/0349709 A1 Oct. 24, 2024

(30) Foreign Application Priority Data

Nov. 24, 2021 (JP) ................................ 2021-190437

(51) Int. Cl.
*A01K 87/06* (2006.01)
*A01K 87/08* (2006.01)

(52) U.S. Cl.
CPC .............. *A01K 87/06* (2013.01); *A01K 87/08* (2013.01)

(58) Field of Classification Search
CPC ...... A01K 87/06; A01K 87/08; A01K 87/008; A01K 87/009
See application file for complete search history.

(56) References Cited

U.S. PATENT DOCUMENTS

| | | | | |
|---|---|---|---|---|
| 888,075 A * | 5/1908 | Eshnaur | A01K 87/06 43/22 |
| 3,372,510 A * | 3/1968 | Arsenault | A01K 87/08 294/58 |
| 4,453,332 A | 6/1984 | Wightman | |

(Continued)

FOREIGN PATENT DOCUMENTS

| | | | | |
|---|---|---|---|---|
| CN | 113994938 A * | 2/2022 | A01K 87/06 |
| GB | 189620882 A * | 9/1897 | A01K 87/08 |

(Continued)

OTHER PUBLICATIONS

Nov. 29, 2022 International Search Report issued in International Patent Application No. PCT/JP2022/038346.

(Continued)

*Primary Examiner* — Katelyn T Truong
(74) *Attorney, Agent, or Firm* — Oliff PLC

(57) ABSTRACT

A reel seat grip member, a reel seat grip structure, and a fishing rod that are lightweight, have a compact hood, and have a high degree of freedom in design. A reel seat grip member includes a fairing portion, and a buttock portion connected to the fairing portion. The fairing portion is attached at least one hood of a pair of hoods for fixing a reel leg of which one end is provided on a rod body, and the buttock portion is attached to the rod body via an attachment member of which one end is provided on the rod body.

13 Claims, 10 Drawing Sheets

(56) References Cited

U.S. PATENT DOCUMENTS

| | | | | | |
|---|---|---|---|---|---|
| 4,519,159 | A * | 5/1985 | Fazio | A01K 87/08 | 43/25 |
| 4,653,215 | A * | 3/1987 | Strader | A01K 87/08 | 43/18.1 R |
| 4,821,447 | A | 4/1989 | Nakayama et al. | | |
| 4,850,130 | A * | 7/1989 | Childre | A01K 87/06 | 43/25 |
| 4,891,899 | A * | 1/1990 | Wulff | A01K 87/06 | 43/22 |
| 5,363,586 | A * | 11/1994 | Balkenbush | A01K 87/08 | 43/25 |
| 5,392,556 | A * | 2/1995 | Ozeki | A01K 87/06 | 43/22 |
| 5,632,111 | A * | 5/1997 | Takizawa | A01K 87/06 | 43/22 |
| 6,105,302 | A * | 8/2000 | Yamamoto | A01K 87/08 | 43/23 |
| 6,397,511 | B1 * | 6/2002 | Atnip | A01K 87/007 | 43/22 |
| 2002/0189149 | A1 * | 12/2002 | Borgeat | A01K 87/06 | 43/18.1 R |
| 2011/0113673 | A1 * | 5/2011 | Huang | A01K 87/08 | 43/23 |
| 2013/0283665 | A1 * | 10/2013 | Poe | A01K 87/02 | 43/18.1 R |
| 2019/0166816 | A1 * | 6/2019 | Iwata | A01K 87/08 | |
| 2020/0037590 | A1 * | 2/2020 | Taniguchi | A01K 97/10 | |
| 2021/0259226 | A1 * | 8/2021 | Rabbitt | A01K 87/08 | |
| 2024/0260556 | A1 | 8/2024 | Kawamura et al. | | |

FOREIGN PATENT DOCUMENTS

| | | | |
|---|---|---|---|
| JP | S64-063327 | A | 3/1989 |
| JP | H07115879 | A * | 5/1995 |
| JP | H11-137132 | A | 5/1999 |
| JP | 2013-021923 | A | 2/2013 |
| JP | 6691842 | B2 | 5/2020 |
| JP | 2020-162513 | A | 10/2020 |
| KR | 10-2018-0042187 | A | 4/2018 |
| KR | 101899833 | B1 * | 9/2018 |
| WO | 2023/002654 | A1 | 1/2023 |

OTHER PUBLICATIONS

May 2, 2024 International Preliminary Report on Patentability issued in International Patent Application No. PCT/JP2022/038346.

Feb. 1, 24, 2025 Office Action issued in Australian Application No. 2022398696.

Feb. 25, 2025 Office Action issued in Japanese Application No. 2021-190437.

Oct. 25, 2025 Office Action issued in Chinese Application No. 202280058075.8.

Jan. 20, 2026 Office Action issued in Korean Patent Application No. 10-2024-7005404.

May 22, 2026 Office Action issued in Singaporean Application No. 11202401352S.

May 10, 2026 Office Action issued in Chinese Patent Application No. 202280058075.8.

* cited by examiner

REEL SEAT GRIP MEMBER, REEL SEAT GRIP STRUCTURE, AND FISHING ROD

TECHNICAL FIELD

Cross Reference

The present application claims priority based on Japanese Patent Application No. 2021-190437 (filed on Nov. 24, 2021), the contents of which are incorporated herein by reference in their entirety.

The present invention relates to a reel seat grip member, a reel seat grip structure, and a fishing rod comprising any one of a reel seat grip member and a reel seat grip structure.

BACKGROUND ART

In the related art, various fishing rods each including a fishing rod reel seat and a grip have been known.

In such a fishing rod, a fishing rod reel seat and a fishing rod grip are usually placed on a rod body, and a reel leg placing portion for placing a reel leg on an upper side or a lower side of a main body is formed on the fishing rod reel seat.

As such a fishing rod, for example, Patent Literature 1 discloses a fishing rod including: a rod body; a cylindrical reinforcing resin layer formed on a circumferential surface of the rod body and having an uneven surface formed on an outer periphery thereof; and a reel seat injection-molded on an outer circumferential surface of the reinforcing resin layer.

In addition, Patent Literature 2 discloses a fishing rod including a rear grip portion on a rear side of a reel seat including a cylindrical reel seat main body having a reel leg placing portion on which a leg portion of a reel is placed, the fishing rod including: a rod main body; and a rear grip rod body in which a rear grip portion is integrally formed by increasing the diameter of a rear portion of a hollow rod body at a diameter change rate larger than a diameter change rate of the rod main body at the time of forming the hollow rod body from a prepreg, in which a rear portion of the rod main body and a front portion of the rear grip rod body are overlapped and joined integrally with each other inside and outside so as to form an overlapping portion having a predetermined length, and at least a part of the overlapping portion is located inside the reel seat main body.

CITATION LIST

Patent Literature

Patent Literature 1: JP H11-137132 A
Patent Literature 2: JP 2013-21923 A

SUMMARY OF INVENTION

Technical Problem

However, in the fishing rod disclosed in Patent Literature 1, since the solid reel seat injection-molded on an outer peripheral surface of a cylindrical reinforcing resin layer is disposed on the reinforcing resin layer in the rod body, there is a problem that the weight increases and the size is huge.

In addition, in the fishing rod disclosed in Patent Literature 2, since the rear grip rod body and the reel seat main body are joined to the rod main body, there is a problem that an increase in weight for bonding is unavoidable.

The present invention has been made in view of the above circumstances, and an object of the present invention is to provide a reel seat grip member, a reel seat grip structure, and a fishing rod that are lightweight, have a compact hood, and have a high degree of freedom in design. Other objects of the present invention will become apparent upon reference to the entirety of the present specification.

Solution to Problem

A reel seat grip member according to an embodiment of the present invention comprises a fairing portion, and a buttock portion connected to the fairing portion. The fairing portion is attached at least one hood of a pair of hoods for fixing a reel leg of which one end is provided on a rod body, and the buttock portion is attached to the rod body via an attachment member of which one end is provided on the rod body.

In the reel seat grip member according to the embodiment of the present invention, the fairing portion is attached to the at least one hood by adhesion, fitting, or mechanical fastening.

In the reel seat grip member according to the embodiment of the present invention, the buttock portion is attached to the attachment member by adhesion, fitting, or mechanical fastening.

In the reel seat grip member according to the embodiment of the present invention, the fairing portion and the buttock portion are fixed to the rod body or fixed to the rod body to be movable.

In the reel seat grip member according to the embodiment of the present invention, in a case where the fairing portion and the buttock portion are fixed to the rod body, the at least one hood and the attachment member are fixed to the rod body by adhesion, fitting, or mechanical fastening.

In the reel seat grip member according to the embodiment of the present invention, in a case where the fairing portion and the buttock portion are fixed to the rod body to be movable, the at least one hood and the attachment member are movable with respect to the rod body in an axial direction of the rod body.

In the reel seat grip member according to the embodiment of the present invention, the at least one hood and the attachment member are movable with respect to the rod body in the axial direction of the rod body such that inner peripheral surfaces of the at least one hood and the attachment member are screwed into an outer peripheral surface of the rod body.

In the reel seat grip member according to the embodiment of the present invention, the fairing portion and the buttock portion are integrally formed by carbon fiber reinforced plastic.

In the reel seat grip member according to the embodiment of the present invention, one or a plurality of notches is formed in a part of the reel seat grip member. In addition, in the reel seat grip member according to the embodiment of the present invention, one or a plurality of honeycomb structures is formed in a part of the reel seat grip member.

A reel seat grip structure according to another embodiment of the present invention comprises any one of the reel seat grip members described above, a pair of hoods for fixing a reel leg provided on a rod body, and an attachment member for attaching the reel seat grip member to the rod body.

A fishing rod according to still another embodiment of the present invention comprises a rod body, any one of the reel seat grip members described above, a pair of hoods for fixing a reel leg provided on the rod body, and an attachment member for attaching the reel seat grip member to the rod body.

Advantageous Effects of Invention

According to the above embodiment, it is possible to provide the reel seat grip member, the reel seat grip structure, and the fishing rod that are lightweight, have a compact hood, and have a high degree of freedom in design.

DESCRIPTION OF EMBODIMENTS

Hereinafter, an embodiment of a fishing rod according to the present invention will be specifically described with reference to the attached drawings. Components common in a plurality of drawings are assigned with the same reference signs throughout the plurality of drawings. It should be noted that each drawing is not necessarily drawn to an accurate scale for the sake of convenience in description.

Figure 1:
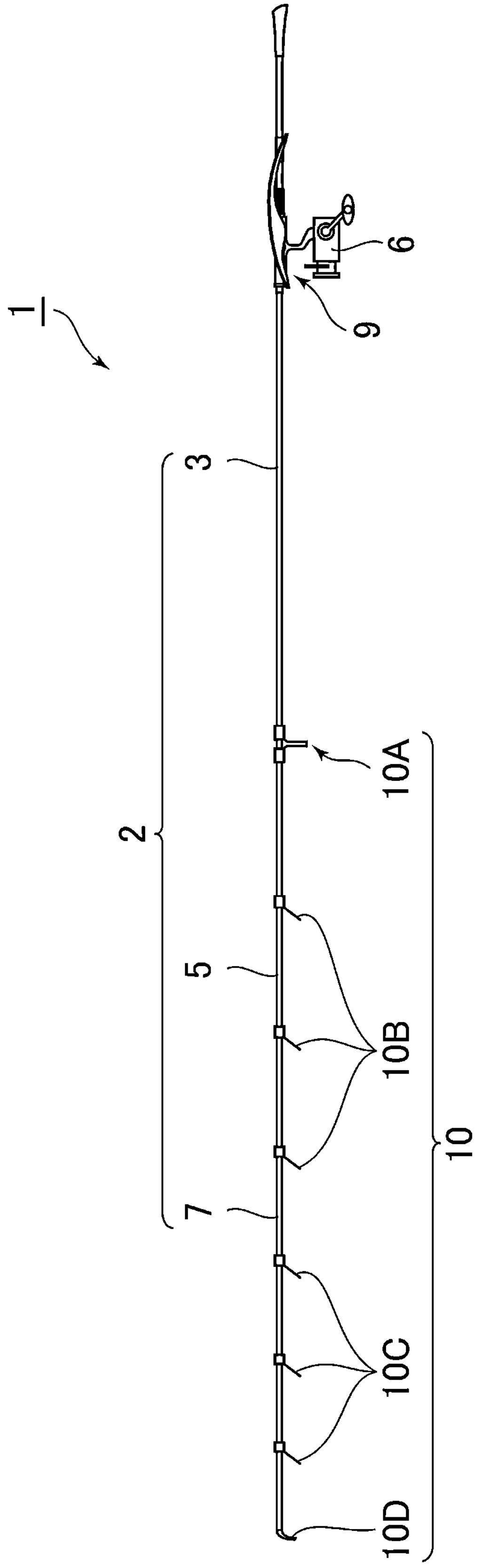
FIG. 1 is a diagram illustrating a fishing rod according to an embodiment of the present invention.

FIG. 1 is a diagram illustrating an embodiment of the fishing rod according to the present invention. As illustrated in the drawing, a fishing rod 1 according to the embodiment of the present invention comprises a rod body 2, a reel 6 attached to the rod body 2 via a reel seat 9, and a fishing line guide 10 attached to the rod body 2. In the illustrated embodiment, the reel seat 9 and the fishing line guide 10 each correspond to an attachment component attached to an outer peripheral surface of the rod body.

The rod body 2 is constituted by, for example, connecting a base rod 3, a middle rod 5, a tip rod 7, and the like to each other. These rod bodies are jointed to each other, for example, as an ordinarily jointed type. The base rod 3, the middle rod 5, and the tip rod 7 can be jointed to each other as a telescopic type, an inversely jointed type, a socket-and-spigot jointed type, or any other known joined type. The rod body 2 may be formed of a single rod body.

Each of the base rod 3, the middle rod 5, and the tip rod 7 is formed of, for example, a tubular body made of a fiber-reinforced resin. This tubular body made of a fiber-reinforced resin is formed by winding a fiber-reinforced resin prepreg (prepreg sheet) in which reinforcing fibers are impregnated with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. In addition, an outer surface of the tubular body is appropriately polished. Each of the rod bodies may be formed in a solid state.

In the illustrated embodiment, the base rod 3, the middle rod 5, and the tip rod 7 comprise a plurality of the fishing line guides 10 (fishing line guides 10A to 10D) for guiding a fishing line fed from the reel 6 attached to the reel seat 9. More specifically, the base rod 3 comprises the fishing line guide 10A, the middle rod 5 comprises the fishing line guide 10B, and the tip rod 7 comprises the fishing line guide 10C. The tip rod 7 comprises the top guide 10D at a distal end thereof, but details thereof are omitted.

Next, examples of a reel seat main body 12 and the reel seat 9 will be described with reference to FIG. 2. The reel seat 9 comprises the reel seat main body 12 having a reel leg placing surface 12*a* on which a reel leg 6*a* of the fishing reel 6 is placed in an axial direction thereof. In the illustrated example, the reel seat main body 12 is provided in a predetermined portion of the fishing rod 1 without a gap between a pair of moving hoods (a first moving hood 14 on a rod tip side and a second moving hood 22 on a rod buttock side) to be described below in order to support the reel leg, but may be formed with a predetermined length between the first moving hood 14 and the second moving hood 22 so as to support a part of the reel leg. Note that, although at least one of the pair of moving hoods may be a fixing hood, the pair of moving hoods (also referred to as floating hoods) will be described in the present specification.

In addition, although not illustrated, the reel seat main body 12 may be formed so as to surround the rod body 2. The reel seat main body 12 can be configured to have a length of 60 to 160 mm, for example, but is not limited thereto. Various forms, dimensions, and shapes other than these are conceivable for the reel seat main body 12, and the reel seat main body 12 is not limited to a specific aspect.

Figure 2:
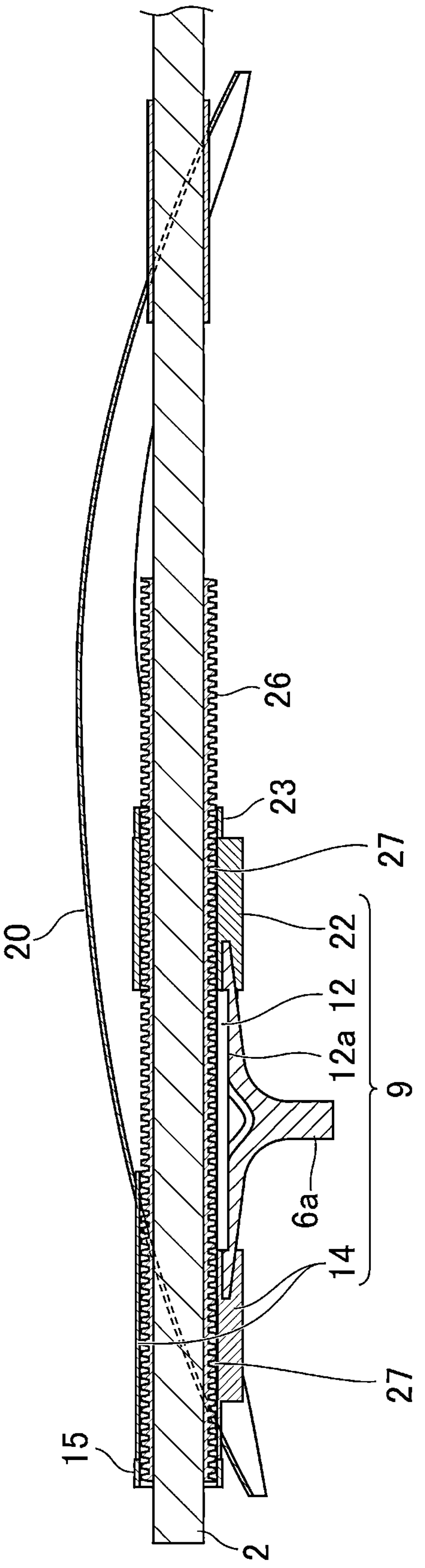
FIG. 2 is a diagram for describing a fishing rod reel seat according to the embodiment of the present invention.

The reel leg placing surface 12*a* of the reel seat main body 12 can be formed flat or substantially flat, and the reel seat main body 12 illustrated in FIG. 2 is formed in a state of extending in an axial direction of the rod body 2. In the illustrated example, as described above, the first moving hood 14 is disposed at one end (rod tip side) of the reel seat main body 12. At least one end of the reel leg placing surface 12*a* of the reel seat main body 12 may be disposed inside the first moving hood 14 or the second moving hood 22.

The second moving hood (also referred to as a floating hood) 22 is attached to the other end side (rod base side) of the reel seat main body 12 so as to be movable in an axial direction. A second nut portion 23 is provided in order to move the second moving hood 22. Similarly, a first nut portion 15 is provided to move the first moving hood 14 described above. The reel seat main body 12, the first moving hood 14, the second moving hood 22, the first nut portion 15, and the second nut portion 23 may be referred to as the reel seat 9, but details thereof are omitted. As will be described later, a configuration without the reel seat main body 12 is also conceivable.

Here, the reel seat main body 12 can be formed to support the reel leg 6*a* on the reel leg placing surface of the reel seat main body such that both ends are supported by the first moving hood 14 and the second moving hood 22. On the other hand, there is no reel seat main body 12, and the reel leg 6*a* may be formed such that both ends of the reel leg 6*a* is supported by the fixing hood 14 and the moving hood 22.

In addition, in the fishing rod 1 having a reel seat grip member 20 according to the embodiment of the present invention, the reel seat main body 12 on which the reel leg 6*a* is placed may be formed on the rod body 2. In addition, in the fishing rod 1 having the reel seat grip member 20 according to the embodiment of the present invention, the reel seat main body 12 on which the reel leg 6*a* is placed may be provided between the fixing hood 14 and the moving hood 22 of a pair of hoods 13, and the reel seat main body 12 and the hood 13 may be integrally formed.

Next, the reel seat grip member 20 according to the embodiment of the present invention will be described with reference to FIGS. 3, 4, and 5. Here, the reel seat grip member 20 is a member that comprises a fairing portion 40 and a buttock portion 50 of the fishing rod 1, which are formed with ranges of A and B illustrated in FIG. 3, and that is intended to impart a grasping property of the fishing rod. Note that, the reel seat grip member 20 can be formed of the portion corresponding to only the fairing portion 40 of the reel seat grip member 20, that is, only the portion corresponding to the range of A illustrated in FIG. 3. In addition, a reel seat grip structure 30 to be described later is a member that has a mechanism for attaching the reel and is intended to facilitate gripping of the fishing rod. Note that, the fairing portion 40 (portion of A) means a front side (foregrip) of the reel seat grip member, and the buttock portion 50 (portion of B) means a grip (middle grip) in the middle of the reel seat grip member.

The reel seat grip member 20 according to the embodiment of the present invention comprises the fairing portion 40 and the buttock portion 50 connected to the fairing portion 40. The fairing portion 40 is attached to at least one hood (first moving hood 14) of the pair of hoods 13 for fixing the reel leg 6*a* of which one end thereof (an end on a left side of the drawing of FIG. 3) is provided on the rod body 2, and the buttock portion 50 is attached to the rod body 2 via the attachment member 25 of which one end thereof (an end on a right side of the drawing of FIG. 3) is provided on the rod body 2.

According to the reel seat grip member 20 according to the embodiment of the present invention, it is possible to provide a reel seat grip member that is lightweight, has a compact hood, and has a high degree of freedom in design. More specifically, different members can be used for the fairing portion and a rear grip (refers to a grip at a rear end of the fishing rod and is similar throughout the present description), and a rod tube portion between the fairing portion and a rear grip portion can be decorated.

In addition, in the reel seat grip member 20 according to the embodiment of the present invention, the fairing portion 40 is attached to the at least one hood (first moving hood 14) by adhesion, fitting (for example, fitting by press-fitting), or mechanical fastening (for example, mechanical fastening by fastening or fitting using a screw (a method for mechanically detachably fixing by using a movable rib or the like)). In this manner, it is possible to move the hood and the fairing portion as one member.

In addition, in the reel seat grip member 20 according to the embodiment of the present invention, the buttock portion 50 is attached to the attachment member 25 by adhesion, fitting (for example, fitting by press-fitting), or mechanical fastening (for example, mechanical fastening by fastening or fitting using a screw (a method for mechanically detachably fixing by using a movable rib or the like)). In this manner, a sliding portion and an attachment portion are provided at two portions together with a portion sliding on the rod body via the hood on the front side of the fairing portion, and thus, the entire reel seat can be stably fixed to the rod body.

In the reel seat grip member 20 according to the embodiment of the present invention, the fairing portion 40 and the buttock portion 50 are fixed to the rod body 2 or fixed to the rod body 2 to be movable. In this manner, it is possible to use reel seat grip members having various grip lengths in accordance with the user's preference.

In the reel seat grip member 20 according to the embodiment of the present invention, in a case where the fairing portion 40 and the buttock portion 50 are fixed to the rod body 2 (without being movable), the at least one hood 13 and the attachment member 25 are fixed to the rod body by adhesion, fitting (for example, fitting by press-fitting), or mechanical fastening (for example, mechanical fastening performed by fastening or fitting using a screw (a method for mechanically detachably fixing by using a movable rib or the like)). In this case, the first moving hood 14 which is at least one hood 13 serves as the fixing hood, and the fixing hood is fixed without being movable with respect to the rod body 2. In this manner, the fairing portion 40 and the buttock portion 50 are fixed to at least one hood 13 (without being movable) and the attachment member 25 fixed (without being movable) to the rod body 2, respectively, and thus, the fairing portion 40 and the buttock portion 50 can be fixed to the rod body 2 (without being movable). Note that, even though the first moving hood 14 which is at least one hood 13 is used as the fixing hood, since the second moving hood 22 can move back and forth in the axial direction of the rod body 2, the reel leg can be fixed and released.

In the reel seat grip member 20 according to the embodiment of the present invention, in a case where the fairing portion 40 and the buttock portion 50 are fixed to the rod body 2 to be movable (in a case where both the fairing portion and the buttock portion are fixed to be relatively movable), the at least one hood 13 and the attachment member 25 are movable with respect to the rod body 2 in the axial direction of the rod body 2. In this manner, fixing positions of the fairing portion 40 and the buttock portion 50 to the rod body 2 can be freely set and changed, and operability of the reel seat grip member 20 can be improved. In addition, since the fairing portion and the buttock portion can be fixed at various positions, the degree of freedom in design of the reel seat grip member 20 can be increased.

Figure 3:
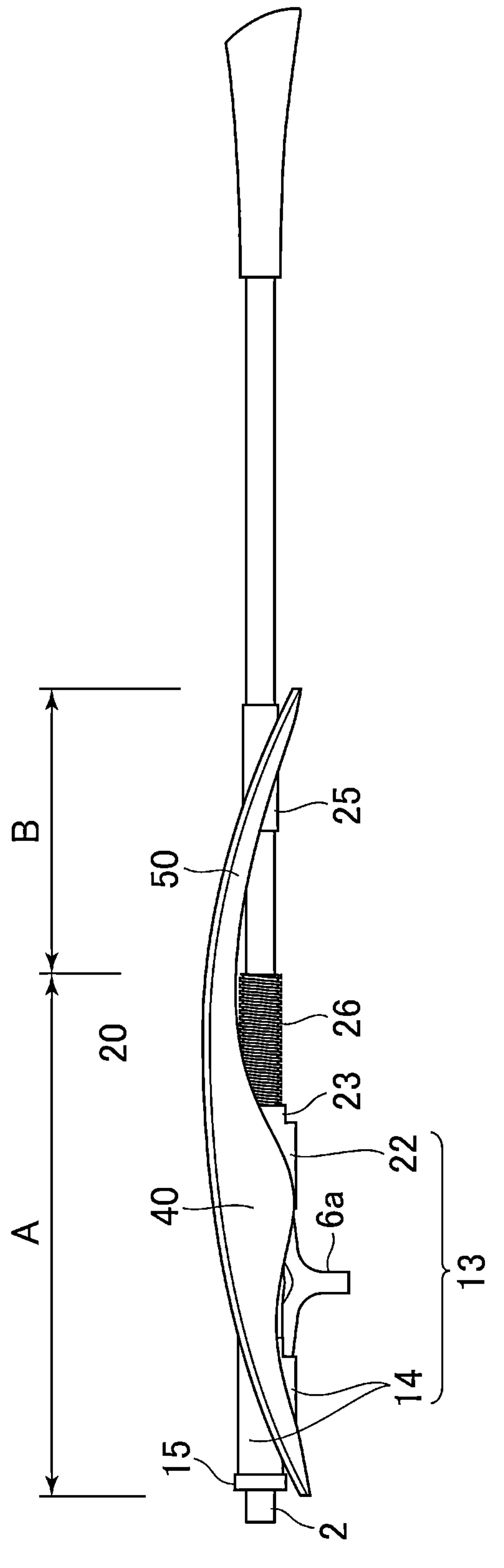
FIG. 3 is a diagram for describing a reel seat grip member according to the embodiment of the present invention.
Figure 4:
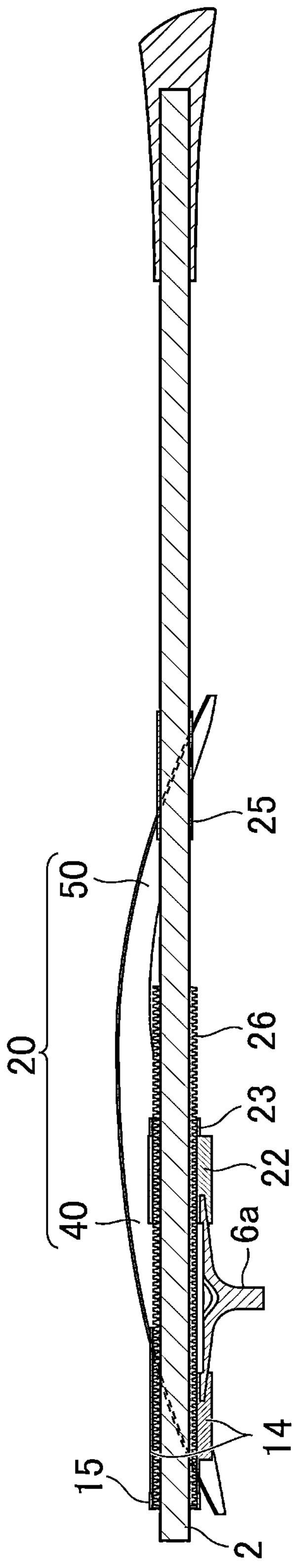
FIG. 4 is a cross-sectional view of the reel seat grip member according to the embodiment of the present invention.
Figure 5:
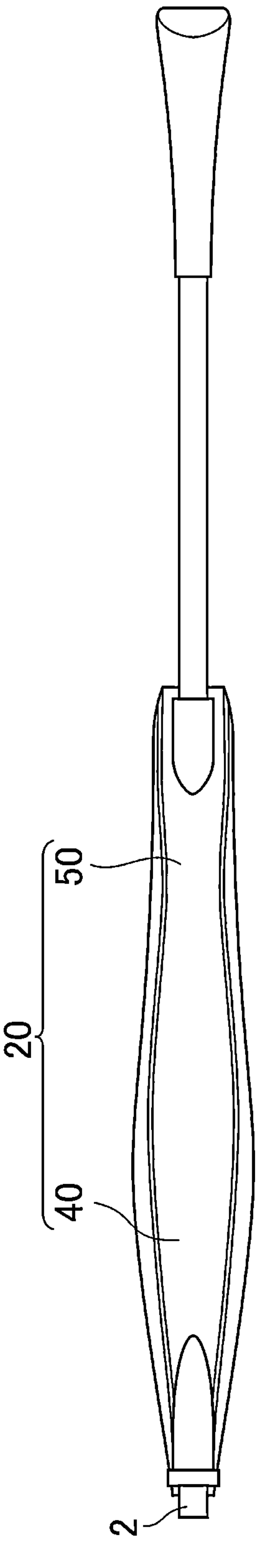
FIG. 5 is a top view of the reel seat grip member according to the embodiment of the present invention.

As illustrated in FIGS. 2, 3, and 4, in the reel seat grip member 20 according to the embodiment of the present invention, the at least one hood 13 and the attachment member 25 (not illustrated) are movable with respect to the rod body 2 in the axial direction of the rod body 2 such that inner peripheral surfaces of the at least one hood 13 and the attachment member 25 are screwed to the outer peripheral surface of the rod body 2. In the examples illustrated in FIGS. 2, 3, and 4, a male screw portion 26 is formed on the outer peripheral surface of the rod body, and a female screw portion 27 (illustrated only in FIG. 2) is formed on inner peripheral surfaces of the first moving hood 14 and the second moving hood 22. In this manner, when a reel seat position is changed in accordance with the user's preference, the reel seat position can be fixed by using a screw mechanism.

Figure 6:
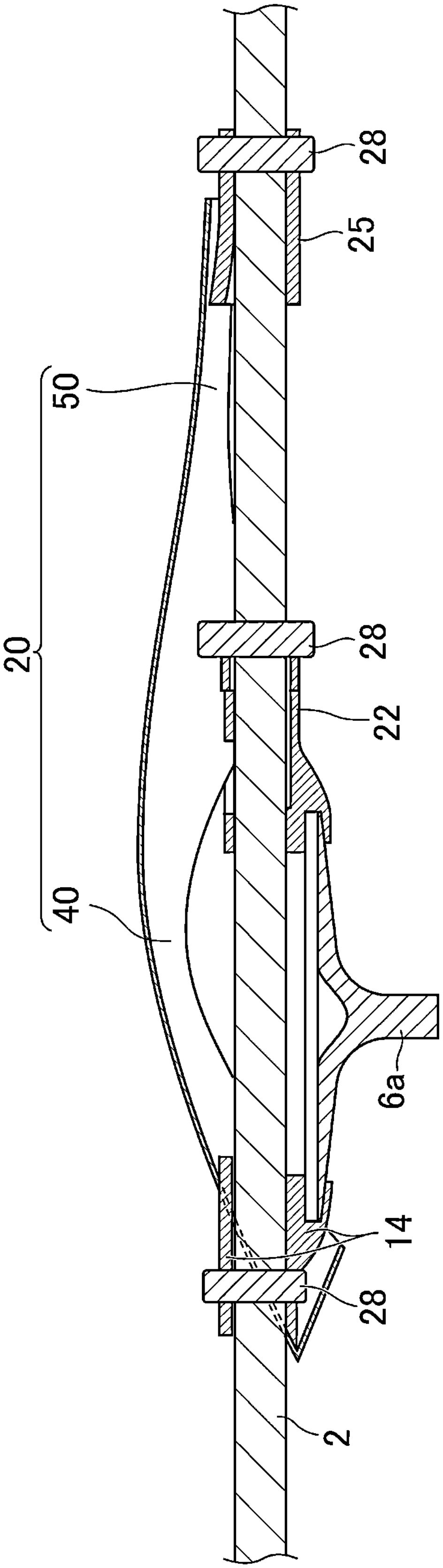
FIG. 6 is a diagram for describing the reel seat grip member according to the embodiment of the present invention.

In addition, as illustrated in FIG. 6, in the reel seat grip member 20 according to the embodiment of the present invention, the at least one hood 13 and the attachment member 25 (not illustrated) are formed in a cylindrical shape or a substantially cylindrical shape such that the inner peripheral surfaces of the at least one hood 13 and the attachment member 25 come into contact with the outer peripheral surface of the rod body 2, and the at least one hood 13 and the attachment member 25 are fixed to the outer peripheral surface of the rod body 2 by using a ring-shaped member 28. The ring-shaped member 28 is removed, and thus, the at least one hood 13 and the attachment member 25 are movable with respect to the rod body 2 in the axial direction of the rod body 2. The ring-shaped member 28 is attached again after moving to a desired position, and thus, the at least one hood 13 and the attachment member 25 can be fixed to the outer peripheral surface of the rod body 2. In this manner, the position of the reel seat is firmly fixed, and can be stably used.

In the reel seat grip member 20 according to the embodiment of the present invention, the fairing portion 40 and the buttock portion 50 are integrally formed by carbon fiber reinforced plastic (CFRP). In addition, continuous fiber (CFRTP), discontinuous fiber (CFRTP), or a hybrid may be used as a material of the reel seat grip member 20. The reel seat grip member is made of such a material, and thus, it is possible to suppress an increase in weight while ensuring sufficient rigidity and strength as the reel seat grip member 20 used for the fishing rod.

A length (longitudinal length) of the reel seat grip member 20 according to the embodiment of the present invention is 100 to 400 mm.

Figure 7A:
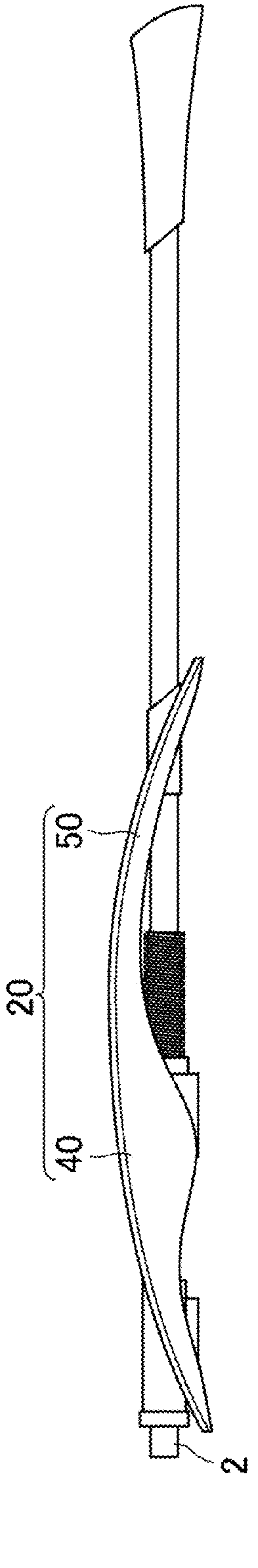
FIG. 7A is a side view of the reel seat grip member according to the embodiment of the present invention.
Figure 7B:
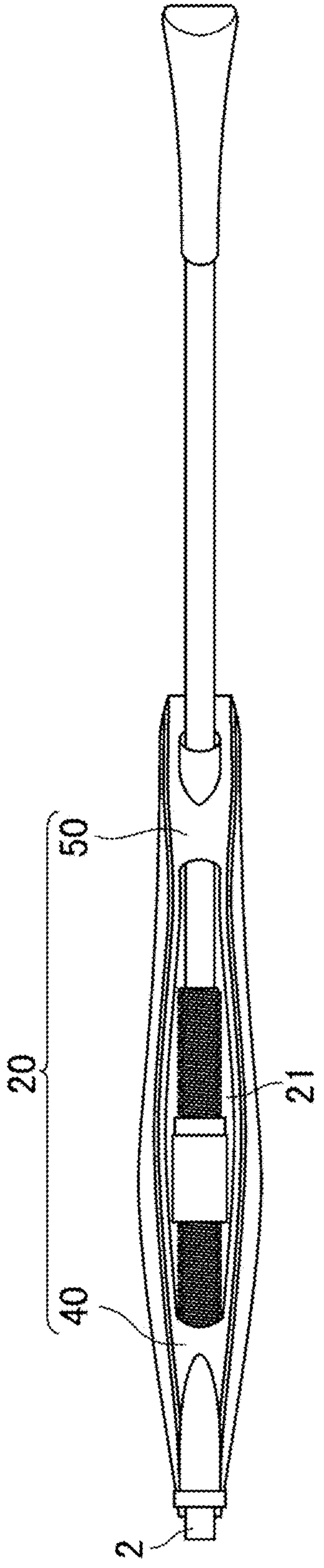
FIG. 7B is a top view of the reel seat grip member according to the embodiment of the present invention.

In addition, as illustrated in FIG. 7, in the reel seat grip member 20 according to the embodiment of the present invention, one or a plurality of notches (in the illustrated example, one notch 21) are formed in a part of the reel seat grip member 20. In this manner, it is possible to significantly reduce the weight.

Figure 8A:
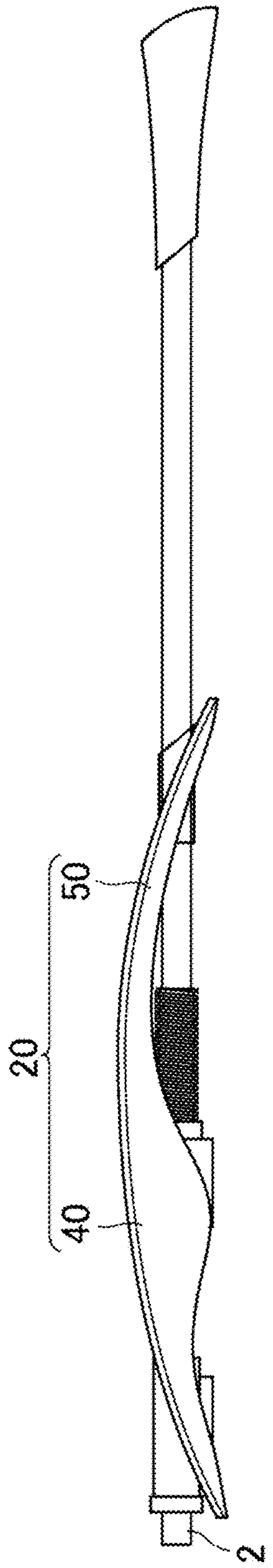
FIG. 8A is a side view of the reel seat grip member according to the embodiment of the present invention.
Figure 8B:
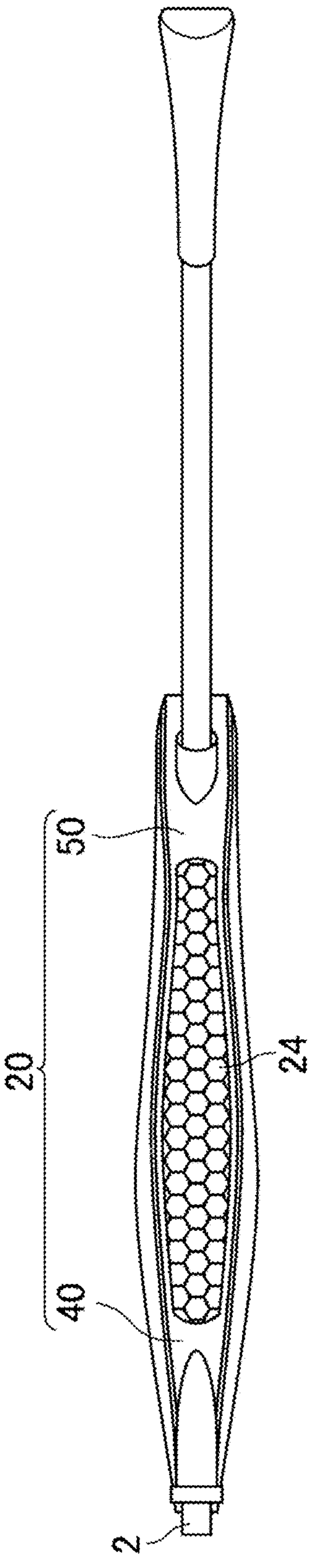
FIG. 8B is a top view of the reel seat grip member according to the embodiment of the present invention.

In addition, as illustrated in FIG. 8, in the reel seat grip member 20 according to the embodiment of the present invention, one or a plurality of honeycomb structures (in the illustrated example, one honeycomb structure 24) are formed in a part of the reel seat grip member 20. In this manner, it is possible to reduce the weight while maintaining necessary strength.

The reel seat grip structure 30 according to the embodiment of the present invention comprises the reel seat grip member 20 according to the embodiment of the present invention described above, the pair of hoods 13 for fixing the reel leg 6*a* provided on the rod body 2, and the attachment member 25 for attaching the reel seat grip member 20 to the rod body 2. When such a reel seat grip structure 30 is formed to be detachable from the rod body 2, the reel seat grip structure can be attached to various rod bodies 2, and various reel seat grip structures can be selected and attached to the rod body 2. Accordingly, the degree of freedom in design can be greatly improved.

The fishing rod 1 according to the embodiment of the present invention comprises the rod body 2, the reel seat grip member 20 according to the embodiment of the present invention described above, the pair of hoods 13 for fixing the reel leg 6*a* provided on the rod body 2, and the attachment member 25 for attaching the reel seat grip member 20 to the rod body 2.

According to the fishing rod according to the embodiment of the present invention, it is possible to provide a fishing rod comprising the reel seat grip member that is lightweight, has a compact hood, and has a high degree of freedom in design. More specifically, different members can be used for the fairing portion and the rear grip portion, and the rod tube portion between the fairing portion and the rear grip portion can be decorated.

The reel seat grip member 20 according to the embodiment of the present invention is configured such that the fairing portion 40 surrounds the nut portion 23 in a range of 50% to 80% in a circumferential direction of the nut portion 23 of the second moving hood 22. In this manner, the reel seat grip member can reduce contact of a hand of an angler with the nut portion of the moving hood during operation of the fishing rod to make the nut portion less likely to loosen. It has been found that such a numerical range is required not only in terms of easiness of gripping of the grip portion but also in order to cover the nut portion of the moving hood for tightening (fixing) the reel leg portion such that a hand or a finger does not touch the nut portion when the grip portion is gripped. It has been found that particularly when 50% or more of the nut portion in the circumferential direction is covered with the grip portion at the time of gripping the grip portion with a hand, the grip portion has a high effect of preventing a gripping finger from touching the nut portion of the moving hood.

In addition, the reel seat grip member 20 according to the embodiment of the present invention is configured to extend such that the rod body is surrounded in a range of 20% to 80% in a circumferential direction over the fairing portion 40. With such a reel seat grip member, not only lightweight and compact hood but also a high degree of freedom in design can be achieved, and the weight can be significantly reduced as compared with the related art.

Dimensions, materials, and arrangements of the components described in this specification are not limited to those explicitly described in the embodiments, and the components may be modified to have any dimensions, materials, and arrangements that may fall within the scope of the present invention. In addition, components not explicitly described in the present specification can also be added to the described embodiment, or some of the components described in each embodiment can also be omitted.

REFERENCE SIGNS LIST

1 fishing rod
2 rod body
3 base rod
4 grip
5 middle rod
6 reel
6*a* reel leg
7 tip rod
9 reel seat
10 fishing line guide
12 reel seat main body
12*a* reel leg placing surface
13 hood
14 first moving hood
15 first nut portion
20 reel seat grip member
21 notch
22 second moving hood
23 second nut portion
24 honeycomb structure
25 attachment member
26 male screw portion
27 female screw portion
28 ring-shaped member
30 reel seat grip structure
40 fairing portion
50 buttock portion

The invention claimed is:

1. A reel seat grip member comprising:

a fairing portion; and a buttock portion connected to the fairing portion, wherein the fairing portion is configured to be attached at one end of the fairing portion to a first hood, at a rod tip side, of a pair of hoods on a rod body for fixing a reel leg, the buttock portion is configured to be attached at one end of the buttock portion to the rod body via an attachment member on the rod body, the buttock portion is configured to be attached to an area of the rod body between a second hood, at a rod butt side, of the pair of hoods and a rear end of the rod body, the reel seat grip member is configured to be spaced away from the rod body between the second hood and the rear end of the rod body, and the area is separated from the second hood toward the rear end of the rod body.

2. The reel seat grip member according to claim 1, wherein the fairing portion is configured to be attached to the first hood by adhesion, fitting, or mechanical fastening.

3. The reel seat grip member according to claim 1, wherein the buttock portion is configured to be attached to the attachment member by adhesion, fitting, or mechanical fastening.

4. The reel seat grip member according to claim 1, wherein the fairing portion and the buttock portion are configured to be fixed to the rod body or fixed to the rod body to be movable.

5. The reel seat grip member according to claim 1, wherein the fairing portion and the buttock portion are configured to be fixed to the rod body, and the first hood and the attachment member are configured to be fixed to the rod body by adhesion, fitting, or mechanical fastening.

6. The reel seat grip member according to claim 1, wherein the fairing portion and the buttock portion are configured to be fixed to the rod body to be movable, and the first hood and the attachment member are configured to be movable with respect to the rod body in an axial direction of the rod body.

7. The reel seat grip member according to claim 6, wherein the first hood and the attachment member are configured to be movable with respect to the rod body in the axial direction of the rod body such that inner peripheral surfaces of the first hood and the attachment member are screwed to an outer peripheral surface of the rod body.

8. The reel seat grip member according to claim 1, wherein the fairing portion and the buttock portion are integrally formed by carbon fiber reinforced plastic.

9. The reel seat grip member according to claim 1, wherein a part of the reel seat grip member includes one or a plurality of notches.

10. The reel seat grip member according to claim 1, wherein a part of the reel seat grip member includes one or a plurality of honeycomb structures.

11. A reel seat grip structure comprising:

the reel seat grip member according to claim 1;

the pair of hoods for fixing a reel leg on the rod body; and the attachment member for attaching the reel seat grip member to the rod body.

12. A fishing rod comprising:

the reel seat grip member according to claim 1;

the rod body;

the pair of hoods for fixing the reel leg on the rod body; and the attachment member for attaching the reel seat grip member to the rod body.

13. The reel seat grip member according to claim 1, wherein the area is rearward of a screw thread of the second hood.

* * * * *